United States Patent
Osenar et al.

(10) Patent No.: US 7,482,086 B2
(45) Date of Patent: **\*Jan. 27, 2009**

(54) ELECTROCHEMICAL POLYMER ELECTROLYTE MEMBRANE CELL STACKS AND MANUFACTURING METHODS THEREOF

(75) Inventors: Paul Osenar, Westford, MA (US); Richard M. Formato, Grafton, MA (US); Attila E. Herczeg, Southborough, MA (US); Mohammad Enayetullah, Sharon, MA (US)

(73) Assignee: Protonex Technology Corporation, Southborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/229,087

(22) Filed: Sep. 16, 2005

(65) Prior Publication Data
US 2006/0024545 A1   Feb. 2, 2006

Related U.S. Application Data

(62) Division of application No. 09/908,359, filed on Jul. 18, 2001, now Pat. No. 6,946,210.

(60) Provisional application No. 60/253,199, filed on Nov. 27, 2000.

(51) Int. Cl.
*H01M 8/02* (2006.01)

(52) U.S. Cl. ............... 429/36; 429/32; 429/34; 429/37; 429/38

(58) Field of Classification Search ............... None
See application file for complete search history.

(56) References Cited

U.S. PATENT DOCUMENTS

| | | | |
|---|---|---|---|
| 3,846,176 A | 11/1974 | Kuehl | |
| 4,397,917 A | 8/1983 | Chi et al. | |
| 4,604,331 A | 8/1986 | Louis | |
| 5,110,691 A | 5/1992 | Krasij et al. | |
| 5,176,966 A | 1/1993 | Epp et al. | |

(Continued)

FOREIGN PATENT DOCUMENTS

EP    0122150 A2    10/1984

(Continued)

OTHER PUBLICATIONS

Patent Abstracts of Japan, vol. 014, No. 229, JP-02060063, "Stacked Fuel Cell" (1990).

*Primary Examiner*—Jonathan Crepeau
(74) *Attorney, Agent, or Firm*—Christine C. O'Day; Edwards Angell Palmer & Dodge LLP (57) ABSTRACT

An improved electrochemical polymer electrolyte membrane cell stack is provided that includes one or more individual fuel cell cassettes, each fuel cell cassette having at least one membrane electrode assembly, fuel flow field and oxidant flow field. Within each fuel cell cassette, each membrane electrode assembly has at least one manifold opening for the passage of reactant manifolds through the cassette, all of which are bonded about the perimeter by a sealant, and each flow field has at least one manifold opening and any manifold openings on the flow fields which do not correspond to a manifold providing reactant for distribution to such flow field is bonded about its perimeter by a sealant. Each fuel cell cassette may also contain other typical components of a electrochemical polymer electrolyte membrane cell stack, such as separator plates or coolant flow fields, which also have manifold openings which may or may not be bonded about the perimeter. The membrane electrode assembly, flow fields, and other components are encapsulated along the peripheral edges by a resin such that the entire periphery of the fuel cell cassette is encapsulated by the resin.

9 Claims, 9 Drawing Sheets

U.S. PATENT DOCUMENTS

| | | | |
|---|---|---|---|
| 5,264,299 | A | 11/1993 | Krasij et al. |
| 5,453,331 | A | 9/1995 | Bloom et al. |
| 5,523,175 | A | 6/1996 | Beal et al. |
| 5,858,569 | A | 1/1999 | Meacher et al. |
| 6,042,955 | A | 3/2000 | Okamoto |
| 6,057,054 | A | 5/2000 | Barton et al. |
| 6,080,503 | A | 6/2000 | Schmid et al. |
| 6,159,628 | A | 12/2000 | Grasso et al. |
| 6,165,634 | A | 12/2000 | Krasij et al. |
| 6,372,372 | B1 * | 4/2002 | D'Aleo et al. ............... 429/34 |
| 6,475,656 | B1 | 11/2002 | Koschany et al. |
| 6,596,427 | B1 | 7/2003 | Wozniczka et al. |
| 2001/0001052 | A1 | 5/2001 | Bonk et al. |
| 2002/0172852 | A1 | 11/2002 | Frank et al. |
| 2003/0031914 | A1 | 2/2003 | Frank et al. |
| 2003/0096153 | A1 | 5/2003 | Osenar et al. |

FOREIGN PATENT DOCUMENTS

| | | |
|---|---|---|
| EP | 0 951 086 A2 | 10/1999 |
| WO | WO-98/33225 | 7/1998 |
| WO | WO-02/093668 A1 | 11/2002 |
| WO | WO-02/093672 A2 | 11/2002 |

* cited by examiner

FIGURE 9

ELECTROCHEMICAL POLYMER ELECTROLYTE MEMBRANE CELL STACKS AND MANUFACTURING METHODS THEREOF

This application is a divisional of U.S. Ser. No. 09/908,359, filed on Jul. 18, 2001 (now U.S. Pat. No. 6,946,210, granted Sep. 20, 2005), which in turn claimed the benefit of priority to U.S. Ser No. 60/253,199, filed Nov. 27, 2000.

TECHNICAL FIELD

This invention relates to electrochemical polymer electrolyte membrane ("PEM") cells and stacks thereof, and more particularly, to PEM fuel cell stacks. The present invention also describes novel processes for producing these PEM fuel cell stacks.

BACKGROUND ART

Electrochemical PEM cells, and particularly, PEM fuel cells are well known. PEM fuel cells convert chemical energy to electrical power with virtually no environmental emissions and differ from a battery in that energy is not stored, but derived from supplied fuel. Therefore, a fuel cell is not tied to a charge/discharge cycle and can maintain a specific power output as long as fuel is continuously supplied. The large investments into fuel cell research and commercialization indicate the technology has considerable potential in the marketplace. However, the high cost of fuel cells when compared to conventional power generation technology has deterred their potentially widespread use. Costs of fabricating and assembling fuel cells can be significant, due to the materials and labor involved, and as much as 85% of a fuel cell's price can be attributed to manufacturing costs.

A single cell PEM fuel cell consists of an anode and a cathode compartment separated by a thin, ionically conducting membrane. This catalyzed membrane, with or without gas diffusion layers, is often referred to as a membrane electrode assembly ("MEA"). Energy conversion begins when the reactants, reductants and oxidants, are supplied to the anode and cathode compartments, respectively, of the PEM fuel cell. Oxidants include pure oxygen, oxygen containing gases, such as air, and halogens, such as chlorine. Reductants, also referred to herein as fuel, include hydrogen, natural gas, methane, ethane, propane, butane, formaldehyde, methanol, ethanol, alcohol blends and other hydrogen rich organics. At the anode, the reductant is oxidized to produce protons, which migrate across the membrane to the cathode. At the cathode, the protons react with the oxidant. The overall electrochemical redox (reduction/oxidation) reaction is spontaneous, and energy is released. Throughout this reaction, the PEM serves to prevent the reductant and oxidant from mixing and to allow ionic transport to occur.

Current state of the art fuel cell designs comprise more than a single cell, and in fact, generally combine several MEAs, flow fields and separator plates in a series to form a fuel cell "stack"; thereby providing higher voltages and the significant power outputs needed for most commercial applications. Depending on stack configuration, one or more separator plates may be utilized (referred to as a "bipolar stack") as part of the stack design. Their basic design function is to prevent mixing of the fuel, oxidant and cooling input streams within the fuel cell stack, while also providing stack structural support. These separator plates serve as current collectors for the electrodes and may also contain an array of lands and grooves formed in the surface of the plate contacting the MEA, in which case the separator plates are often referred to only as "bipolar plates" and the array of lands and grooves as "flow fields". Alternatively, the flow field may be a separate porous electrode layer. Ideal separator plates for use in fuel cell stacks are thin, lightweight, durable, highly conductive, corrosion resistant structures that can also, if desired, provide effective flow fields and thereby become bipolar plates.

In the flow fields, the lands conduct current from the electrodes, while the grooves between the lands serve to distribute the gaseous reactants utilized by a fuel cell, such as hydrogen, oxygen or air, evenly over the faces of the electrodes. The channels formed by the lands and grooves also facilitate removal of liquid reaction byproducts, such as water. A thin sheet of porous paper, cloth or felt, usually made from graphite or carbon, may be positioned between each of the flow fields and the catalyzed faces of the MEA to support the MEA where it confronts grooves in the flow field to conduct current to the adjacent lands, and to aid in distributing reactants to the MEA. This thin sheet is normally termed a gas diffusion layer ("GDL"), and is incorporated as part of the MEA.

Fuel cell stacks may also contain humidification channels within one or more of the coolant flow fields. These humidification channels provide a mechanism to humidify fuel and oxidants at a temperature as close as possible to the operating temperature of the fuel cell. This helps to prevent dehydration of the PEM as a high temperature differential between the gases entering the fuel cell and the temperature of the PEM causes water vapor to be transferred from the PEM to the fuel and oxidant streams. The location of the humidification channels can either be upstream from the MEA, such as in the fuel cell stacks described in U.S. Pat. No. 5,382,478 to Chow et al., and U.S. Pat. No. 6,066,408 to Vitale et al., or downstream from the MEA, such as those described in U.S. Pat. No. 5,176,966 to Epp et al.

Of necessity, certain stack components, such as the GDL portion of the MEA, are porous in order to provide for the distribution of reactants and byproducts into, out of, and within the fuel cell stack. Due to the porosity of elements within the stack, a means to prevent leakage of any liquid or gases between stack components (or outside of the stack) as well as to prevent drying out of these porous elements due to exposure to the environment is also needed. To this end, gaskets or other seals are usually provided between the surfaces of the MEA and other stack components, such as flow fields, and on portions of the stack periphery. These sealing means, whether elastomeric or adhesive materials, are generally placed upon, fitted, formed or directly applied to the particular surfaces being sealed. These processes are labor intensive and not conducive to high volume manufacturing and add to the high cost of fuel cells. The variability of these processes also results in poor manufacturing yield and device reliability.

Fuel cell stacks range in design depending upon power output, cooling, and other technical requirements, but may utilize a multitude of MEAs, seals, flow fields, and separator plates, in intricate assemblies that result in manufacturing difficulties and further increase fuel cell costs. For example, one fuel cell stack, described in U.S. Pat. No. 5,683,828, to Spear et al., employs bipolar plates containing up to ten separate layers adhesively bonded together, each layer having distinct channels that are dedicated to passing cooling water through the fuel cell stack for thermal management.

These multitudes of individual components are typically assembled into one sole complex unit to form the fuel cell stack. The stack is then compressed, generally through the use of end plates and bolts although banding or other methods may be used, such that the stack components are held tightly together to maintain electrical contact there between. These current means of applying compression add even more components and complexity to the stack and pose additional sealing requirements. Various attempts have been made in the fuel cell art to cure these deficiencies in fuel cell stack assembly design and thereby lower manufacturing costs.

U.S. Pat. No. 6,080,503, to Schmid et al., describes the replacement of gasket based seals within certain portions of the stack with an adhesive based material in the form of tapes, caulks or layers. However, assembly of this stack still requires manual alignment of the components during the adhesion process, in a manner not unlike caulking a seal, and sealing only occurs at those interfaces where adhesive has been applied through active placement.

U.S. Pat. No. 4,397,917, to Chi et al., describes the fabrication of subunits within a fuel cell stack for ease in handling and testing. However, this design relies on conventional sealing among the components and between subunits. In addition no manifolds internally penetrate the subunit.

U.S. Pat. No. 5,176,966, to Epp et al., describes a method of forming at least some of the required gaskets directly into the fuel cell stack assembly. Specifically, the MEA is made with corresponding carbon paper and then an extrudable sealant is applied into grooves cut within the carbon paper.

U.S. Pat. No. 5,264,299, to Krasij et al., describes a fuel cell module having a PEM interposed between the two porous support layers which distribute reactant to the catalyst layers in which the peripheral portion of the support layers are sealed with an elastomeric material such that the PEM is joined with the support layers and the open pores of the support layers are filled with the elastomeric material making it fluid impermeable. The elastomeric material solidifies to form a fluid impermeable frame for the PEM and support layer assembly.

U.S. Pat. No. 5,523,175, to Beal et al., describes an improvement of U.S. Pat. No. 5,264,299 which comprises a plurality of gas distribution channels on the support layers and utilizes a hydrophilic material for sealing of the open pores. However, this improvement does not address the issue of gaps between the MBA and the support plates.

U.S. Pat. No. 6,165,634, to Krasij et al., describes the use of a flouroelastomer sealant in bonding individual stack components and the edges of several cells within a stack. However, this improvement requires piece-meal application to the components and, as such, does little to improve the labor required to assemble the stack.

U.S. Pat. No. 6,159,628, to Grasso et al., describes the use of thermoplastic tape as a replacement for traditional elastomeric gasket based seals thereby eliminating the waste associated with cutting gaskets from large sheets of elastomer. Unfortunately, similar to conventional sealing mechanisms, this method also requires manual placement of the tape pieces.

As can be seen from the above discussion, none of these designs adequately compensate for the current design deficiencies that result in the high manufacturing costs of fuel cell stacks. An improved style of fuel cell stack that is less complex, more reliable, and less costly to remove, replace and manufacture would be a significant addition to the field.

Accordingly, it is an object of the present invention to provide an improved fuel cell stack design which would assemble together individual modules to form a fuel cell stack of requisite power output, and would allow for disposal and replacement of an individual module in the event of a failure within one such module.

Another object of the present invention provides a fuel cell stack comprised of pre-fabricated individual modules that are standardized to specific power outputs or other technical specifications thereby allowing for the quick and efficient assembly of a complete fuel cell stack with minimal manufacturing processes being employed, by combining such standardized modules to meet the required specifications of the completed fuel cell stack.

Yet another object of the present invention is to provide for a reduction in the complexity of a fuel cell stack by reducing the number of components and seals required for stack construction, while maintaining the required power output for the stack, thereby increasing the reliability of the fuel cell stack.

Still another object of the present invention is to provide for an improved method of sealing porous components within the stack or a module thereof, as well as a method of sealing the stack or module periphery that is less labor intensive and more suitable to high volume manufacturing processes.

Still another object of the present invention is to provide a simplified compression means for the fuel cell stack assembly wherein the components of the fuel cell stack assembly would remain in close contact with a minimum of additional elements being added to the assembled stack.

Additional objects, advantages and novel features of the invention will be shown in the accompanying drawings and description.

DISCLOSURE OF THE INVENTION

The above described and other objects and features of the present invention can be achieved by providing a fuel cell stack wherein individual modules are utilized and complex fuel cell stack assemblies are created through the combination of such individual modules. Each module, referred to herein as a "fuel cell cassette" is a simplified stack assembly which has bonded internal manifolding and is externally encapsulated about its perimeter to form a self-contained unit. These fuel cell cassettes may be designed to achieve standardized specifications and may be fabricated prior to the manufacture of the fuel cell stack.

A fuel cell cassette comprises:

a MEA having at least one MEA manifold opening extending through the thickness thereof wherein each of the membrane electrode assembly manifold openings is bonded at the perimeter by a first sealant;

a fuel flow field having at least one fuel flow field manifold opening extending through the thickness thereof wherein each fuel flow field manifold opening which does not correspond to a manifold providing fuel reactant for distribution to the fuel flow field is bonded at the perimeter by a second sealant;

an oxidant flow field having at least one oxidant flow field manifold opening extending through the thickness thereof wherein each oxidant flow field manifold opening which does not correspond to a manifold providing oxidant reactant for distribution to the oxidant flow field is bonded at the perimeter by a third sealant;

wherein the MEA, the fuel flow field, and the oxidant flow field are assembled in a stack relative to each other such that the MEA manifold openings, the fuel flow field manifold openings, and the oxidant flow field manifold openings are aligned; and wherein the peripheral edges of the MEA, the fuel flow field, and the oxidant flow field are encapsulated together by a resin such that the entire periphery of the fuel cell cassette is encapsulated by the resin.

The number and arrangement of fuel cell components within an individual fuel cell cassette may vary according to the power output requirements or other technical specifications required for the finished cassette, and any of such components within the fuel cell cassette may be paired with a separator plate to separate the fuel/oxidant streams and to provide cassette stability. In further embodiments, the fuel cell cassette may optionally include one or more coolant flow fields or humidification channels, if there were cooling requirements for the finished cassette or if a humidification section was desired. One or more fuel cell cassettes are then assembled together to form a complete fuel cell stack.

Innovative processes for the sealing of internal ports and fuel cell component peripheral edges are also disclosed. These processes can be tailored to produce fuel cell cassettes of the present invention and fuel cell stacks comprising such fuel cell cassettes in a wide variety of design assemblies. Specifically, in the preferred embodiment, the bonding of internal manifold openings and external peripheral encapsulation is provided through the use of vacuum assisted resin transfer molding (VARTM) which inherently places the sealing material where needed within porous components of the fuel cell cassette and also vacuum infuses open peripheral edges of the components with a sealant to simultaneously encapsulate the entire periphery of the fuel cell cassette. In another embodiment, this encapsulation could be achieved with the injection of a molten thermopolymer resin appropriately placed.

A method of manufacturing a fuel cell cassette comprising the steps of:

bonding at least one manifold opening which extends through the thickness of a MEA about the perimeter of the MEA manifold opening using a first sealant;

bonding at least one manifold opening which extends through the thickness of a reactant flow field about the perimeter of the reactant flow field manifold opening using a second sealant, the reactant flow field having at least one reactant flow field manifold opening which is not bonded about the perimeter to allow for distribution of reactant into the reactant flow field;

assembling the MEA and the reactant flow field relative to each other to form a stacked formation such that the reactant flow field manifold openings are aligned with the membrane electrode assembly manifold openings thereby defining at least one manifold channel which extends through the thickness of the stacked formation;

stacking a non-porous layer adjacent to the top and bottom of the stacked formation to form a non-porous layer/stacked formation assemblage;

applying a compression means to the non-porous layer/stacked formation assemblage;

surrounding the non-porous layer/stacked formation assemblage with a resin;

applying a pressure differential means to the non-porous layer/stacked formation assemblage through at least one manifold channel for a predetermined interval such that the resin is drawn into the peripheral edges of the stacked formation and impregnated into the peripheral edges of the MEA and the reactant flow field;

allowing the resin to solidify thereby forming a bond between the peripheral edges of the MEA and the reactant flow field such that the periphery of the stack formation is encapsulated within the resin.

In one embodiment of the present invention, assembly of the finished fuel cell stack is further simplified by interposing the fuel cell stack assembly between two joined housing pieces to apply compression to the components of the fuel cell stack without the addition of a multitude of end plates and bolts. Preferably, the housing pieces are joined with a sealant.

The fuel cell cassettes of the present invention may be used in fuel cell systems such as PEM fuel cells based on hydrogen or direct methanol and anion exchange membrane based alkaline fuel cells. The fuel cell cassettes of the present invention may also be used in a host of electrochemical applications that utilize electrolyte membranes other than the fuel cell systems discussed above. These applications include but are not limited to batteries, methanol/air cells, electrolyzers, concentrators, compressors and reactors.

DRAWINGS

Other features, aspects, advantages and preferred embodiments of the present invention will be better understood and explained in more detail with reference to the following figures.

BEST MODE FOR CARRYING OUT THE INVENTION

Figure 1:
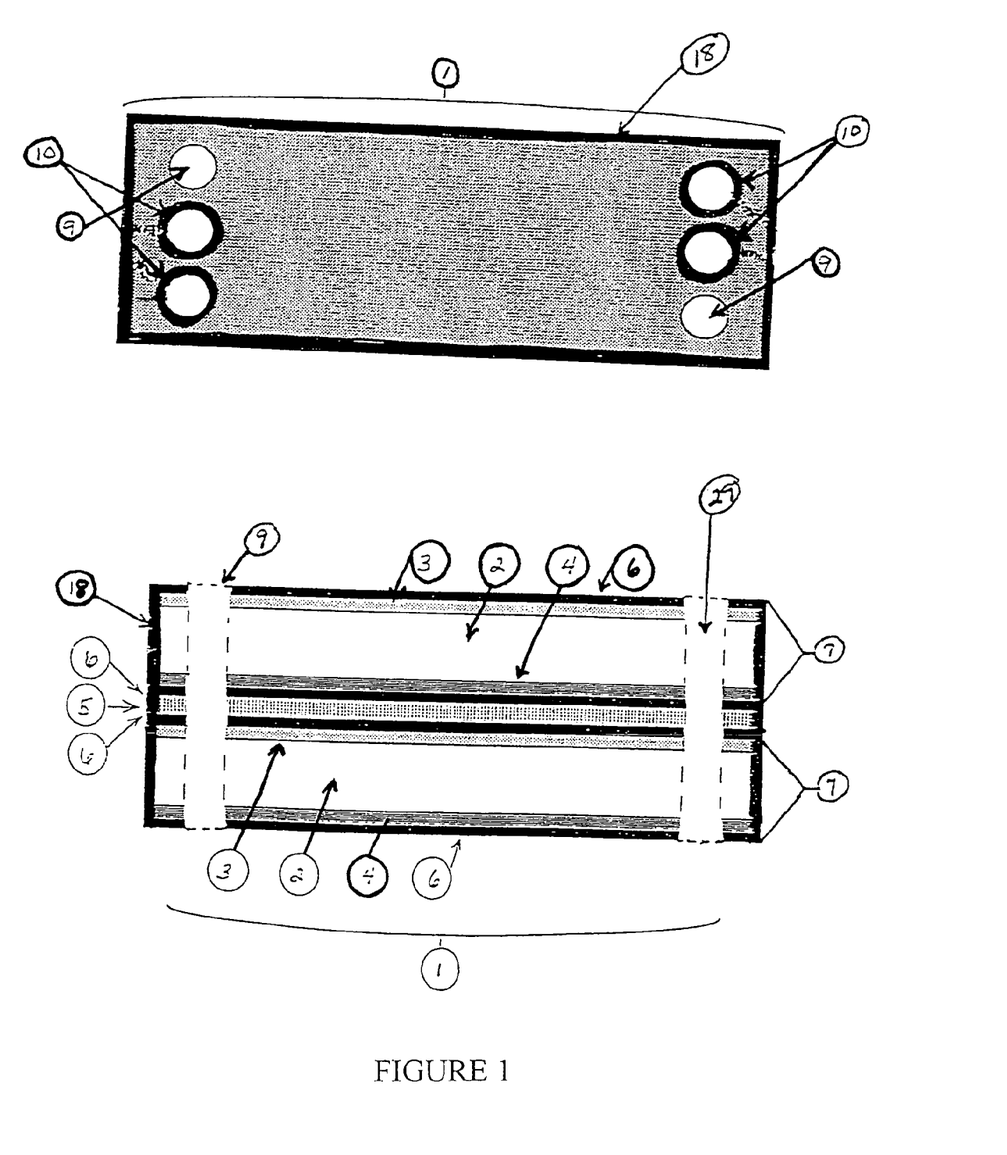
FIG. 1 is a cross sectional and top view of one embodiment of a fuel cell cassette of the present invention.

Referring now to FIG. 1, a fuel cell cassette 1 of the present invention is shown. The fuel cell cassette 1 shown comprises two unit cells 7, each unit cell having a separator plate 6, a fuel flow field 3, a MEA 2, and an oxidant flow field 4. A coolant flow field 5 is sandwiched between the two unit cells 7, with the addition of separator plates 6, to provide cooling capability to the fuel cell cassette. However, it should be understood that the fuel cell cassette 1 is shown in its present configuration to facilitate the illustration of the present invention. As will be apparent to those skilled in the art, an individual fuel cell cassette may embody various assemblies of MEAs, flow field plates and separator plates, as well as other fuel cell components to form unit cells within the fuel cell cassette and also that each such unit cell may be repeated or combined with different unit cells, dependent upon the power output, humidification and/or cooling requirements for the completed fuel cell cassette.

Figure 2:
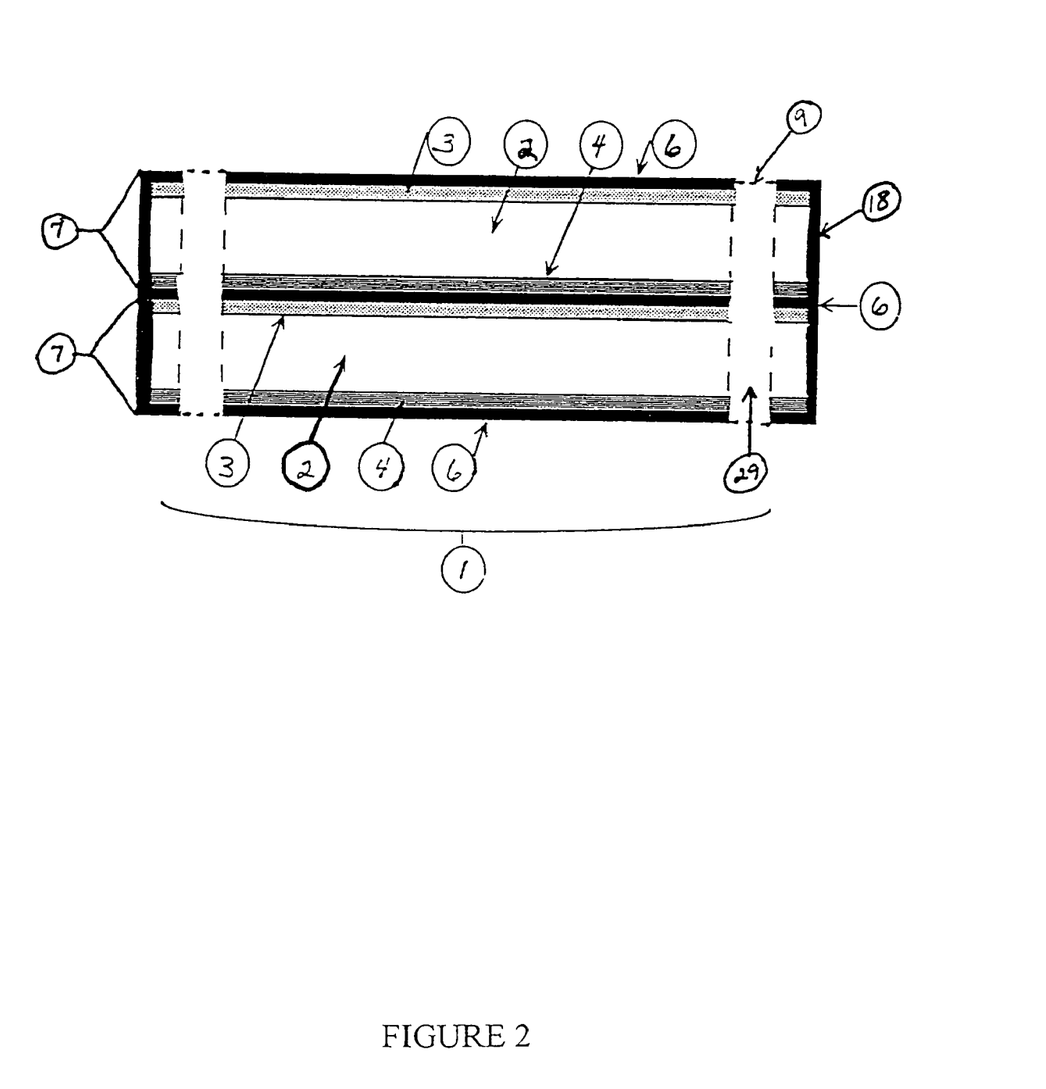
FIG. 2 is a cross sectional view of a second embodiment of the fuel cell cassette of the present invention.

For example, FIG. 2 shows a fuel cell cassette 1 wherein the assembly for one unit cell 7 consists of (in this order): a separator plate 6, a fuel flow field 3, a MEA 2, and an oxidant flow field 4. This is referred in the art as a "bipolar fuel cell arrangement". In FIG. 2, the bipolar fuel cell arrangement unit cell 7 is repeated more than once to illustrate that more than one unit cell 7 may be repeated, but unlike the assembly shown in FIG. 1, no coolant flow field is employed. In a typical bipolar fuel cell stack cassette, the unit cell 7 will normally be repeated more times than shown in FIG. 2, since each additional unit cell 7 results in increased voltage output for the fuel cell cassette 1.

Figure 3:
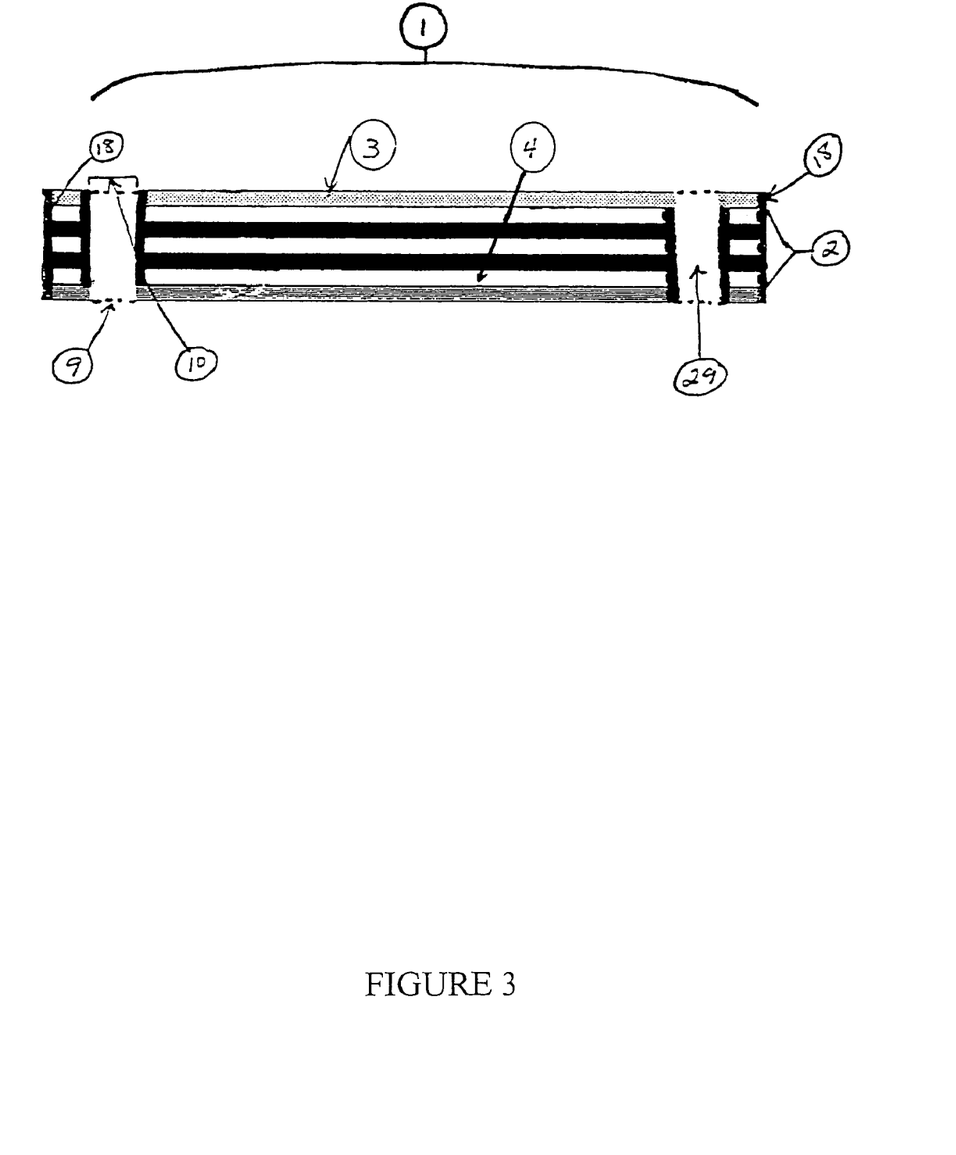
FIG. 3 is a cross sectional view of a third embodiment of the fuel cell cassette of the present invention.

FIG. 3 shows a fuel cell cassette 1 having only one unit cell. As seen in FIG. 3, a lower voltage fuel cell cassette 1 assembly may consist of only a fuel flow field 3, a MEA 2, and an oxidant flow field 4.

Figure 4:
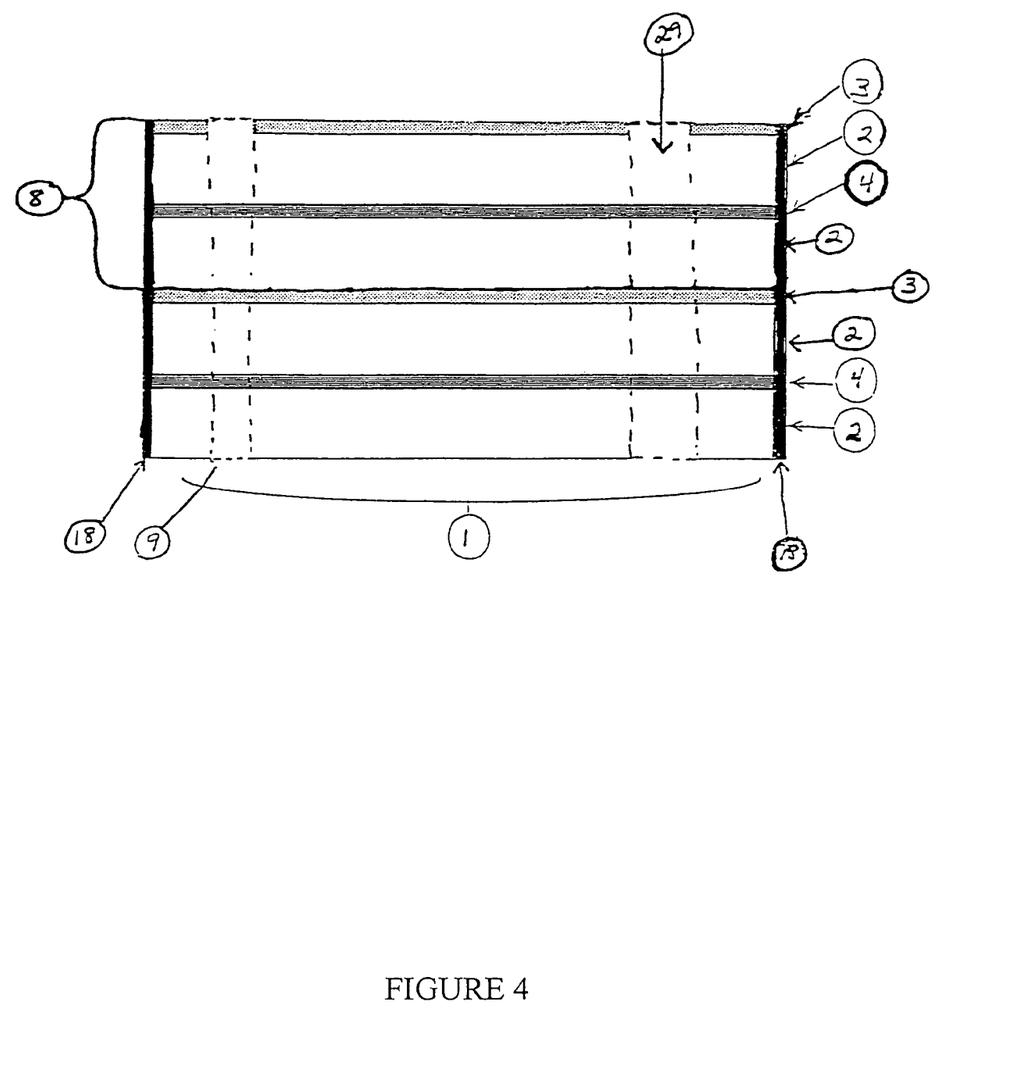
FIG. 4 is a cross sectional view of yet another embodiment of the fuel cell cassette of the present invention.

FIG. 4 shows another variation of a fuel cell cassette 1 assembly, which may be referred to as an "edge collection arrangement" (also known as a parallel or non-bipolar stack). In this assembly, a unit cell 8 consists of (in this order): a fuel flow field 3, a MEA 2, an oxidant flow field 4, and another MEA 2. Two edge collection arrangement unit cells 8 are shown in FIG. 4, but as explained above, the unit cell 8 may be repeated as many times as necessary in the fuel cell cassette 1 to increase the current by the desired amount. FIG. 4 shows an edge collection arrangement without a coolant flow field, however, a coolant flow field may be added by placing a separator plate, a coolant flow field, and another separator plate between any pair of fuel/oxidant flow fields.

As discussed above, the assemblies shown in FIG. 2, FIG. 3 and FIG. 4 are presented to indicate the variety with which the individual components may be combined to form useful fuel cell cassettes. For example, coolant flow fields may cool each unit cell, or none of them, depending upon the cassette design. In still other fuel cell cassette designs, the reactant flow fields may be contained on a bipolar plate and not as separate layers. Any useful combination of the typical fuel cell component layers known to those skilled in the art may be used as the assembly for a fuel cell cassette of the present invention.

Referring again to FIG. 1, the MEA 2 may be purchased from commercial suppliers or otherwise may be made in accordance with various methods of manufacturing known in the art, such as those methods described in U.S. Pat. No. 5,330,860 to Grot et al; U.S. Pat. No. 5,316,871 to Swathirajan et al., and U.S. Pat. No. 5,211,984 to Wilson. Generally, the anode side and cathode side, each on opposing faces of the membrane, comprise either finely divided catalyst particles, such as platinum or its alloys, or finely divided carbon particles having the catalyst on its surfaces. The catalyst particles or catalyst-bearing carbon particles are dispersed throughout a polymeric binder or matrix that typically comprises either a proton conductive polymer and/or a fluoropolymer. In one preferred embodiment of the present invention, the MEA 2 is constructed using a decal process wherein the catalyst ink is coated, painted, sprayed or screen-printed onto Teflon® or Kapton® blanks (both available commercially from E.I. duPont de Nemours and Company, U.S.A.), and the resulting decal is then transferred from the blank to the membrane surface and bonded, typically through the application of heat and pressure. In another preferred embodiment, a MEA 2 is fabricated wherein electrodes are coated with a catalyst containing a precious metal. In this embodiment, finely distributed platinum is deposited onto specially treated carbon mats, at about 0.05 to about 10 milligrams of platinum per square centimeter, and a PEM is hot pressed between two such carbon mats with the coated side of the mats in contact with the membrane. PEMs useful in these MEAs include perfluorinated sulfonic acid membranes, such as Nafion® (available commercially from E.I. duPont de Nemours and Company, U.S.A.), Gore-Select® (available commercially from W.L. Gore & Associates, Inc., U.S.A.), Aciplex® (available commercially from Asahi Kasei Kogyo Kabushiki Kaishe Corporation, Japan), and Flemion® (available commercially from Asahi Glass Company, Ltd., Japan), but any PEM known in the art may be utilized.

Figure 5:
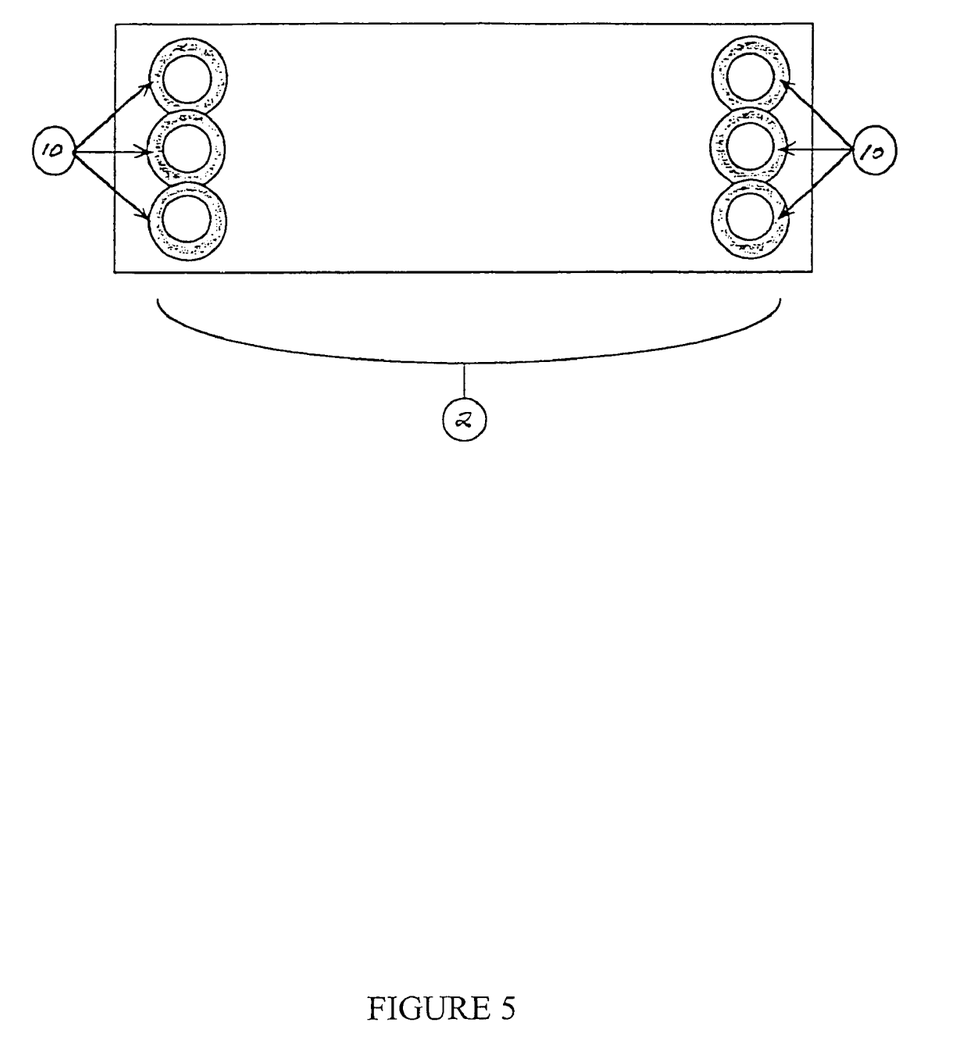
FIG. 5 is a top view of a MEA for use in the present invention wherein each manifold port has been bonded about its perimeter.

The MEA 2 of the present invention includes one or more manifold openings 9 through its thickness of the MEA 2 to allow for fuel, oxidant and, if required, coolant access into the fuel cell cassette 1. Such manifold openings 9 may be punch cut into the MEA 2 through the use of a die, laser cut into the MEA 2, or shaped by other suitable methods-known in the art. The number and size of the openings 9 may vary and are dependent upon the design of the fuel cell cassette 1 and the shape and diameter of the access manifolds needed for the distribution of reactants and coolants into the fuel cell cassette. Generally, such manifold openings 9 are circular in shape, but the openings 9 may be formed in any geometric shape without limiting the usefulness of the methods described herein. In the preferred embodiment shown in FIG. 1, the MEA 2 has a total of six circular manifold openings 9—two for fuel access, two for oxidant access and two for coolant access. However, as mentioned above, those skilled in the art will recognize that the number and location of openings 9 is dependent upon the specific assembly design. being utilized for the fuel cell cassette 1. For example, in the assembly shown in FIG. 2, there is no coolant flow field. Therefore, no coolant access into the fuel cell cassette 1, and no manifold opening for such coolant access, is required. For effective fuel cell cassette 1 operation, each manifold opening 9 of the MEA 2 is bonded about its perimeter by a sealant to enable gas and liquid distribution throughout the fuel cell cassette 1 to be controlled by the flow fields and to prevent leakage of the reactants from the manifold openings 9 into the MEA 2. FIG. 5 shows a MEA 2 having each manifold opening bonded about its perimeter 10.

The fuel flow field 3, the oxidant flow field 4, and the coolant flow field 5 may be purchased from commercial suppliers or otherwise may be made in accordance with various methods of manufacturing known in the art. In the preferred embodiment, laser cut stainless steel screens are employed for use as these fields. However, graphite, titanium or any corrosion resistant alloy may also be used. In another preferred embodiment, one or more of the flow fields are comprised of composite polymeric/graphite materials. Each flow field includes the same number of manifold openings 9 through its thickness as the number of manifold openings 9 included on the MEA 2. However, on each flow field 3, 4, and 5 the manifold openings 9 corresponding to the manifold openings 9 being utilized on that specific flow field plate for distribution of reactant or coolant remain unbonded while all other manifold openings 9 on such flow field are bonded about their perimeter 10.

As discussed above, various assembly designs may be utilized for the fuel cell cassette 1 and some of these assembly designs, such as those shown in FIG. 2 and FIG. 3, may utilize a separator plate 6. The separator plate 6 should be thin, lightweight, durable, electrically conductive and corrosion resistant. Preferably, stainless steel is used for the separator plate 6. However, graphite, titanium or any corrosion resistant alloy may also be used. Alternatively, one or more of the separator plates 6 could be fashioned from composite polymeric/graphite materials.

Perimeter bonding 10 of specific manifold openings 9 of the porous components of the fuel cell cassette 1 is accomplished through the use of a pressure differential which allows the sealant to be drawn into and impregnated within the interstices of the porous component surrounding the manifold opening 9. In one preferred embodiment, the pressure differential is accomplished by vacuum assisted resin transfer molding.

In the embodiment shown in FIG. 1, the porous components include the GDL of the MEA 2 and the fuel, oxidant and coolant flow fields 3, 4 and 5, but the separator plates 6 are non-porous and do not require bonding about the perimeter of any manifold openings. Other fuel cell cassette designs known to those skilled in the art may include other porous components which may also be bonded through the use of the process described herein.

Figure 6:
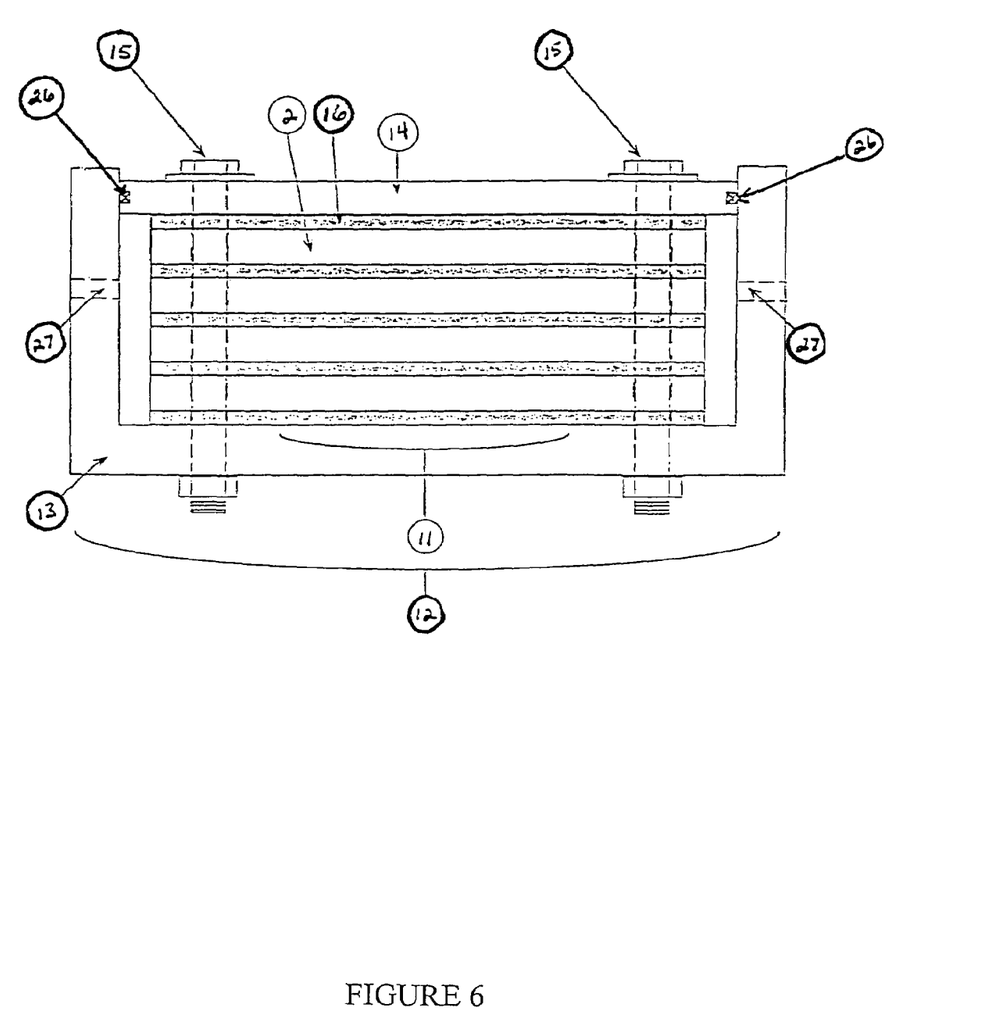
FIG. 6 is a cross sectional view of a port-seal fixture used in the manufacturing of the present invention which contains an assembly of MEAs and spacer films.

Preferably, the vacuum assisted resin transfer molding process for such perimeter bonding 10 is accomplished by first cutting a non-porous polymeric spacer film 16 with the same manifold opening configuration as the MEA 2. If more than one MEA 2 is being bonded at one time, then the MEAs 2 and spacer films 16 are stacked, one on top of the other, with the manifold openings 9 of the MEAs 2 and the spacer films 16 aligned to form a MEA/spacer film assembly 11. The MEA/spacer film assembly 11 is then placed into a port-seal-fixture ("PSF") 12 as shown in FIG. 6. The port-seal-fixture 12 consists of a mold 13, top seal/compression plate 14, bolts 15 and vacuum holes 27. In the preferred embodiment, the number and location of manifold openings in each MEA component are as shown in FIG. 1 such that six manifold channels 29 are formed in the MEA/spacer film assembly. Bolts 15 are then placed through the four corner manifold channels 29 of the MEA/spacer film assembly 11 to act as a compression means and also to seal the MEA/spacer film assembly 11 against any sealant flow in the direction perpendicular to the surface of the MEAs 2. However, those skilled in the art will recognize that any compression means which is capable of uniformly distributing the load over the entire surface of the MEA/spacer film assembly 11 may be employed as the compression means, including external press, bolting, or banding.

Once the system is under compression, bonding of the manifold openings 9 may commence. To seal the two middle manifold openings 9 which do not have bolts 15 extending therethrough, a free-flowing resin is introduced into the entire volume of each opening 9. The vacuum holes 27 are used, with the appropriate fittings, to pull a vacuum on the MEA/spacer film assembly 11 for a preset time such that the resin is drawn into each MEA 2 of the MEA/spacer film assembly 11 and is impregnated within each MEA 2 at the perimeter of the manifold openings 9 being bonded. The vacuum is confined to the edges of the MEA/spacer film assembly 11 by adding an additional non-porous polymer spacer film 16 layer on the top and bottom of the assembly 11 in combination with an O-ring gasket seal 26 in the top compression plate 14 as a sealing means.

The sealant utilized to bond the perimeter of the manifold openings 9 is selected such that it is free-flowing and fills the void spaces. The sealant must also be chosen with regard to the chemical and mechanical properties required for the conditions encountered in an operating fuel cell system. For example, the sealant must be non-reactive with the reactants and byproducts within the fuel cell system and must be able withstand the operating temperature of the fuel cell system. Further, the sealant must not shrink or release more than minimal amounts of solvent into the fuel cell system.

Sealants useful in the present invention include both thermoplastics and thermoset elastomers. Preferred thermoplastic sealants include, but are not limited to, thermoplastic olefin elastomers, such as Santoprene® (available commercially from Advanced Elastomer Systems, L.P., U.S.A.), thermoplastic polyurethanes or plastomers, such as Exact® (available commercially from The Exxon Corporation, U.S.A.), polypropylene, polyethylene, polytetrafluoroethylene, fluorinated polypropylene, and polystyrene. However, those skilled in the art will recognize that other thermoplastics having the required chemical and mechanical properties may be utilized.

Preferred thermoset elastomer sealants include, but are not limited to, epoxy resins, such as 9223-2 (available commercially from the Minnesota Mining and Manufacturing Company, U.S.A.) and AY105/HY991 (available commercially from Ciba Specialty Chemical Corporation, U.S.A.), PUR resin such as Araldite®2018 (available commercially from Ciba Specialty Chemical Corporation, U.S.A), ALIPS resin such as FEC2234 (available commercially from Morton International, Inc., U.S.A.), SYLGARD® 170 A/B (available commercially from Dow Corning Corporation, U.S.A.), Fluorel® resin (available commercially from the Minnesota Mining and Manufacturing Company, U.S.A.), Fluorolast® resin (available commercially from Lauren International, Inc, U.S.A.), urethanes, silicones, fluorosilicones, and vinyl esters.

Upon completion of the vacuum, excess sealant that did not become impregnated within the edges of the manifold openings 9 is drained. The entire PSF 12 is allowed to sit until the sealant is fully solidified and each middle MEA 2 manifold opening 9 is bonded about its perimeter 10. In order to bond all of the manifold openings 9 of the MEA 2, the MEA/spacer film assembly 11 is again placed into the PSF 12 and bolts 15 are placed into the two middle manifold openings 9 which were previously bonded, leaving the remaining openings 9 open. The steps described above are repeated to bond the remaining manifold openings 9.

Those skilled in the art should recognize that the sequence illustrated herein is preferred for the bonding of the manifold opening 9 configuration of the MEA 2 shown in FIG. 5. Therefore, any number of manifold openings 9 on a MEA 2 may be bonded about their perimeter 10 in any order without departing from the scope of the present invention.

For effective fuel cell cassette 1 operation, manifold openings 9 must also be bonded on the various porous components to be utilized in the fuel cell cassette 1, such as the flow fields 3, 4, and 5, in order to control gas and liquid distributed throughout the fuel cell cassette 1. As discussed above, the MEA 2 requires all manifold openings 9 to be bonded 10 as distribution of fuel/oxidant into the stack occurs through the reactant flow fields 3 and 4. Unlike the MEA 2, each flow field 3, 4, and 5 requires distribution of a reactant or coolant into the flow field, and it is desirable to prevent leakage of such reactant or coolant to the incorrect flow field. For example, on the oxidant flow field 4, the manifold openings 9 from which oxygen (pure or in air) will enter the fuel cell cassette 1 must remain open to allow for diffusion of the oxidant across the MEA 2. These porous components may have additional manifold openings 9 to allow for manifold access through the fuel cell cassette 1 for distribution to other flow fields and these remaining manifold openings 9 must be bonded to prevent the diffusion of gas or coolant into the incorrect flow field. Therefore, each flow field 3, 4, and 5 will have different positioning of bonded and unbonded manifold openings 9. To accomplish the manifold opening 9 bonding for each flow field component, the preferred method described above for bonding a manifold opening 9 on the MEA 2 is utilized, but the bolts 15 are placed through those manifold openings 9 which are to remain unbonded on such flow fields 3, 4, and 5.

Once all porous components of the fuel cell cassette 1 have been bonded about the perimeter of those manifold openings 9 not required for distribution of reactant or coolant, all components, porous and non-porous are assembled into the final fuel cell cassette 1 design assembly. Referring again to FIG. 1, in one preferred embodiment, the final fuel cell cassette 1 design assembly consists of the following components (in the following order): a separator plate 6, a fuel flow field 3, a MEA 2, and oxidant flow field 4, a separator plate 6, a coolant flow field 5, a separator plate 6, a fuel flow field 3, a MEA 2, an oxidant flow field 4, and a separator plate 6. The final fuel cell cassette design assembly is formed such that all components are assembled relative to each other to form a stacked formation having the manifold openings 9 located on each component aligned with the manifold openings 9 located on the other components to define a plurality of manifold channels 29 extending through the thickness of the fuel cell cassette assembly. If other assembly designs are utilized, such as those shown in FIG. 2 and FIG. 3, the components would be aligned in the same manner. Each of the components of the fuel cell cassette design assembly is bonded along its peripheral edges 18 with the other components in the fuel cell cassette design assembly in order to form the completed fuel cell cassette 1 of the present invention, such that the fuel cell cassette 1 has a fully encapsulated edge periphery 18 to separate the fuel cell cassette components from the outside environment thereby preventing membrane dry out on exposure to the ambient and to provide structural support for the fuel cell cassette 1.

Figure 7:
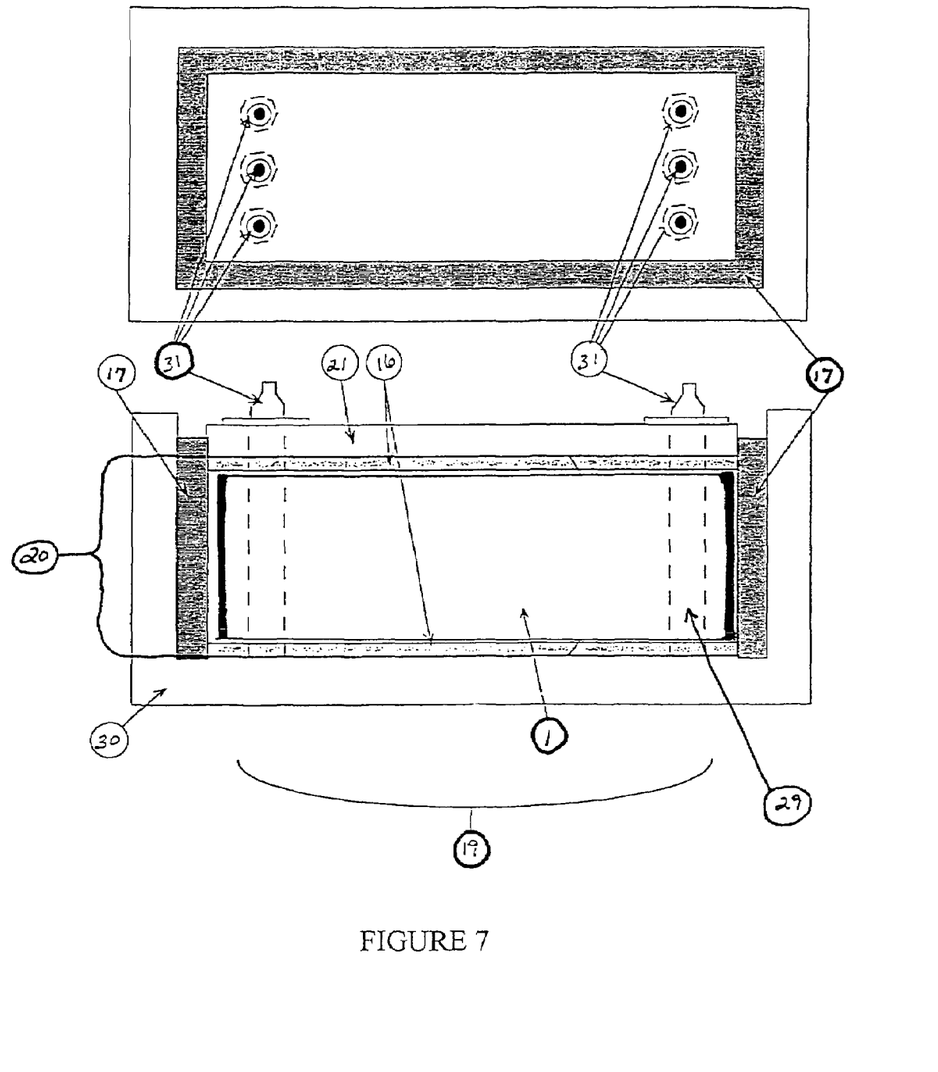
FIG. 7 is a cross sectional view and top view of the edge encapsulation fixture used in the manufacturing of the present invention which contains a fuel cell cassette assembly design.

The peripheral edge encapsulation is conducted through the use of a pressure differential which draws the resin into the interstices of any porous components and within the spaces separating one component from the other and impregnates the resin there between. In one preferred embodiment, the pressure differential is accomplished through vacuum assisted resin transfer molding. Preferably, a piece of non-porous polymeric spacer 16 film is placed on both the top and bottom sides of the final design assembly for the fuel cell cassette 1 in order to cap the assembly. The cassette/film assembly 20 is then placed into the edge encapsulation fixture ("EEF") 19, as shown in FIG. 7. The EEF 19 consists of a mold 30, top seal/vacuum plate 21, vacuum fittings 31 to the manifold channels 29 and a compression means. The top seal/vacuum plate 21 serves two functions: It evenly distributes the load to the cassette/film assembly 20 and contains fittings 31 to uniformly introduce vacuum to each manifold channel 29. The compression means is required to insure that the flowable resin fully encapsulates the non-porous components while using the minimum amount of resin 17. There must be enough compliance in the cassette/film assembly 20 to uniformly distribute the load over its entire surface. A number of techniques can be used to supply the required load and compression means, including an external press, bolting, or banding. Preferably, a guide mechanism is used to ensure that the top seal/vacuum plate 21 remains perpendicular to the base of the EEF 19.

In one preferred method, a compressive load is first applied to the cassette/film assembly 20 using torque bolts 15 or a hand press. To fully encapsulate the cassette/film assembly 20, a free-flowing resin 17 is poured into the mold 30, outside the periphery of the cassette/film assembly 20. Any resin 17 useful for the perimeter bonding of the manifold openings 9 of the porous components may be used for the encapsulation of the periphery of the fuel cell cassette 1. Once the compressive load is applied, a vacuum is applied to the EEF 19 through the vacuum fittings 31. The compressive load insures that the vacuum is pulled only in the manifold openings 9 via the manifold channels 29. The resin 17 flows into the outer edges of the fuel cell cassette/film assembly 20, thereby encapsulating the peripheral edges of the porous and non-porous components of the fuel cell cassette 1. This provides a secondary seal for all flow fields and other porous components by separating the entire fuel cell cassette 1 periphery from the outside environment while also preventing the edges of all such porous components from drying out on exposure to the ambient environment. Further, the encapsulated periphery 18 provides structural support for the fuel cell cassette 1 and a surface area on the resulting fuel cell cassette 1 on which the fittings and other hardware needed for reactant, coolant, and current distribution can be fixed.

The resin 17 is allowed to sit within the mold 30 of the EEF 19 and solidify. Once hardening is complete, the top seal/vacuum plate 21 is removed, followed by the removal of the non-porous film 16 layer from each side of the fuel cell cassette 1. The top and bottom edge of the fuel cell cassette 1 may then be trimmed and the edges routed to remove any excess resin.

Figure 8:
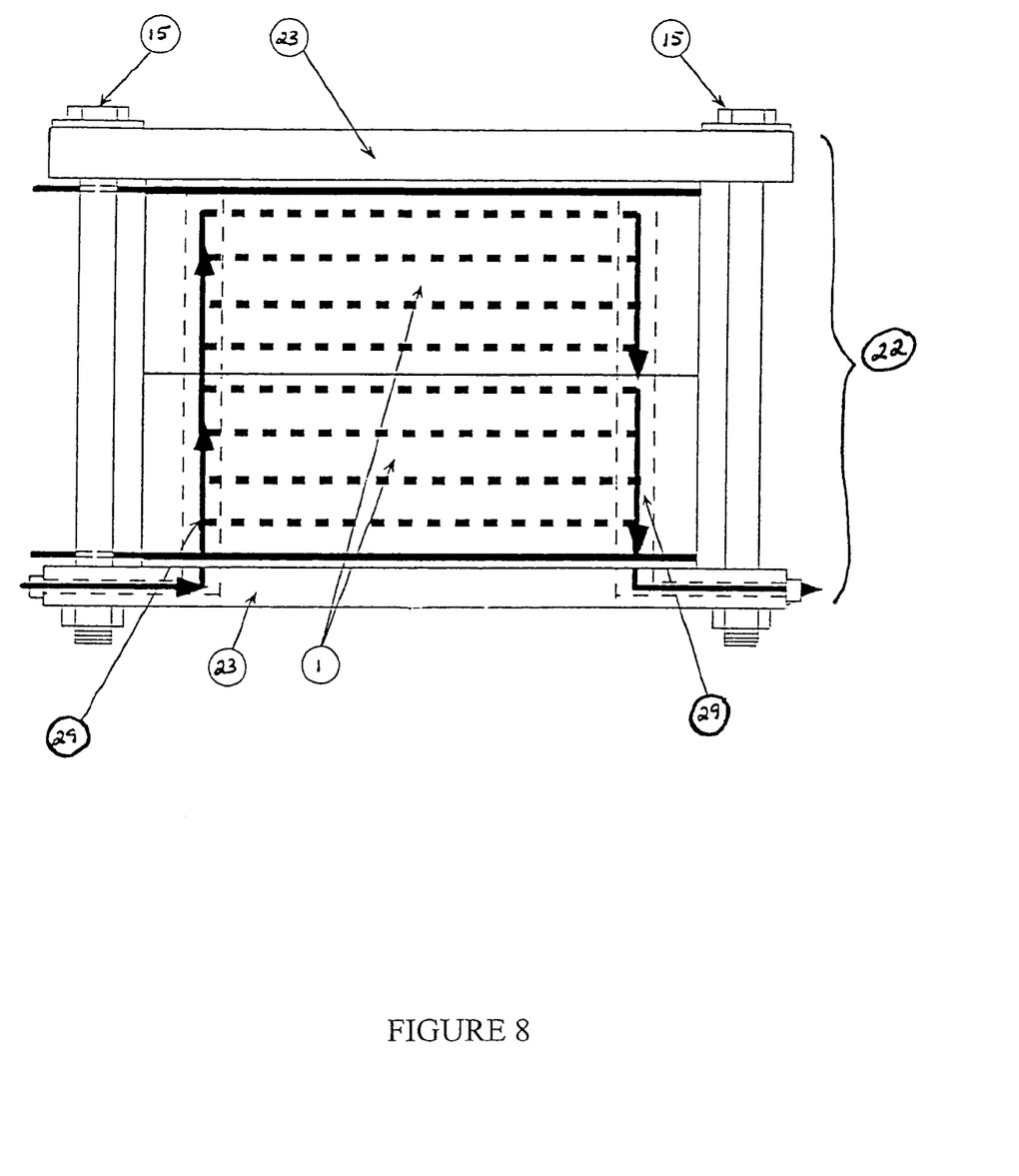
FIG. 8 is a cross sectional view of a fuel cell stack which is comprised of fuel cell cassettes of the present invention with the addition of end plates and a compression means.

Turning now to FIG. 8, a fuel cell stack 22 comprising two fuel cell cassettes 1 of the present invention is shown. In such fuel cell stack 22, endplates 23 and further compression means, such as bolts 15, have been added to insure contact within the fuel cell stack 22. Typically, the endplates 23 are heavy metallic structures, with internal channels for the flow of reactants and coolant, as well as bolts 15 and gaskets for compression. A number of endplate configurations are known to those skilled in the art.

Although a fuel cell stack 22 comprising two fuel cell cassettes 1 is shown, any other number of fuel cell cassettes 1 may be utilized in the fuel cell stack 22 depending upon final output requirements of the fuel cell system. If lower output requirements are sufficient, a fuel cell stack 22 may consist of only one fuel cell cassette 1 with the addition of endplates 23 or other compression means. If more than one fuel cell cassette 1 is utilized for the fuel cell stack 22, each fuel cell cassette 1 must be stacked such that the manifold openings 9 of all the fuel cell cassettes 1 are aligned to form manifold channels 29 extending through the fuel cell stack 22.

Figure 9:
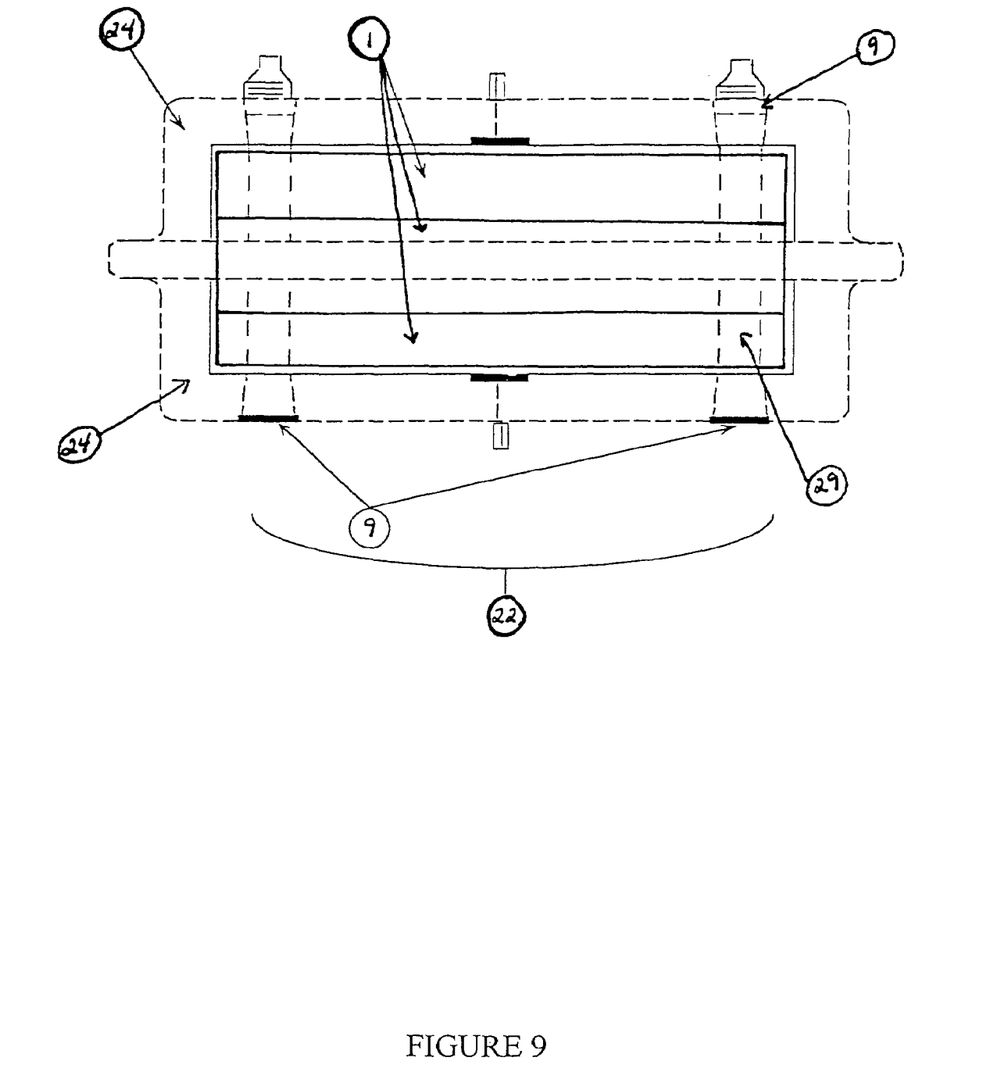
FIG. 9 is a cross sectional and top view of fuel cell cassettes of the present invention wherein the fuel cell cassettes are contained within two sealed housing pieces for use as a typical fuel cell stack.

Alternatively, in a further embodiment of the invention, a fuel cell stack 22 may be manufactured in which the fuel cell cassettes 1 of the present invention are contained within two housing pieces 24 as shown in FIG. 9. This embodiment eliminates much of the expensive and bulky hardware needed for the compression means in the fuel cell stack 22 shown in FIG. 8 as the endplates 23 and bolts 15 are no longer required.

The housing pieces 24 may be formed of metal, thermosets, or traditional engineering thermoplastics. Preferred thermoplastics include polyether sulfones, polyphenylene sulfones, polyphenylene sulfide, polysulfone, polyphenylene oxide, polyphenylene ether, polypropylene, polyethylene, polytetrafluoroethylene, and fluorinated polypropylene, or blends thereof. Additionally, the thermoplastic material may contain a filler material, such as glass fibers, graphite fibers, aramid fibers, ceramic fibers, silica, talc, calcium carbonate, silicon carbide, graphite powder, boron nitride, polytetrafluoroethylene, and metal powders or fibers. In one preferred embodiment, the housing pieces are formed from a glass fiber filled polysulfone. Preferred thermosets include epoxies or polyurethanes.

In FIG. 9, one preferred embodiment of a fuel cell stack 22 is shown which comprises a first housing piece 24 having a base opening and a sidewall opening extending from the base opening to define a first storage compartment and having at least one reactant manifold opening 9 extending through the thickness of the base opening. A second housing piece 24 is shown having a top opening and a sidewall opening extending from the top opening to define a second storage compartment and further having at least one reactant manifold opening 9 extending through the thickness of the top opening.

One or more fuel cell cassettes 1 of the present invention are placed within the storage compartment of the base portion of the first housing piece 24. In the embodiment shown in FIG. 9, there are three such fuel cell cassettes 1 being utilized for the fuel cell stack 22. If more than one fuel cell cassette 1 is stacked, the fuel cassettes 1 must be stacked such that the manifold openings 9 of all the fuel cell cassettes 1 are aligned. The top portion of the second housing piece 24 may then be placed such that the sidewall portion of the second housing piece 24 is resting on the sidewall portion of the first housing piece 24. If both first and second housing pieces 24 contain manifold openings 9, such as shown in the embodiment of FIG. 9, then the reactant manifold openings 9 of the first housing piece 24 are aligned with the manifold openings 9 of the second housing piece 24 and the manifold openings 9 of the fuel cell cassettes 1 to form manifold channels 29 through the thickness of the fuel cell stack 22 and both housing pieces 24. However, in some embodiments, only one of the housing pieces 24 may contain manifold openings 9 and the manifold channels 29 may only extend through the fuel cell cassettes 1 and one of the housing pieces 24. Once the manifold channels 29 are formed, the two housing pieces 24 may be joined, preferably by means of a sealant, although bolts or other mechanical means of joining may be used.

In the preferred embodiment, sealing is accomplished by first applying a compression means to the two housing pieces 24. The compression means may be a platen press, fasteners or other compression means known in the art. A sealant is then injected by an injection molding process at the interface of the sidewall portions of the first and second housing pieces 24. The sealant is selected with regard to the chemical and mechanical properties required for the conditions encountered in an operating fuel cell system, such as the ability to withstand the operating temperatures within such fuel cell system. Preferably, the sealant is polypropylene, but other polymer sealants known in the art, such as urethanes or epoxies may also be used. Sealants which may be used also include, but are not limited to, PUR resin such as Araldite®2018 (available commercially from Ciba Specialty Chemical Corporation, U.S.A.), ALIPS resin such as FEC2234 (available commercially from Morton International, Inc., U.S.A.), SYLGARD® 170 A/B (available commercially from Dow Corning Corporation, U.S.A.), Fluorel® resin (available commercially from the Minnesota Mining and Manufacturing Company, U.S.A.), Fluorolast® resin (available commercially from Lauren International, Inc, U.S.A.), silicones, fluorosilicones, and vinyl esters.

Once the sealant has solidified, the compression means is removed as compression for the fuel cell stack 22 is now inherently provided by the two sealed housing pieces 24.

A fuel cell stack 22 formation comprised of fuel cell cassettes 1 of the present invention is thereby encased within the storage compartments of the two joined housing pieces 24 while reactant access to the fuel cell stack 22 is provided through the manifold channels 29.

While preferred embodiments have been shown and described, various modifications and substitutions may be made without departing from the spirit and scope of the invention. Accordingly, it is to be understood that the present invention has been described by way of example, and not by limitation.

What is claimed is:

1. A fuel cell stack comprising:
    at least one fuel cell cassette, each fuel cell cassette comprising at least two unit cells, each fuel cell cassette being individually encapsulated about its entire periphery by a resin and comprising internal components which have been selectively and simultaneously sealed by penetration of the resin therein to reduce or eliminate undesired reactant flow therein, each fuel cell cassette having at least one reactant manifold opening through the thickness thereof for reactant distribution and collection in the fuel cell cassette and further having at least one planar outer surface, wherein the fuel cell cassettes are assembled in a stack formation relative to each other such that the reactant manifold openings of the fuel cell cassettes are aligned to form at least one reactant manifold channel;
    a reactant manifold connected to the reactant manifold channel;
    a compression means connected to the planar outer surface of the fuel cell cassettes in the stack formation,
    wherein the compression means comprises a first housing end piece having at least one reactant manifold opening extending through the thickness thereof and a second housing end piece; and a joining means connecting the first housing end piece and the second housing end piece;
    wherein the stack formation is interposed between the first housing end piece and the second housing end piece such that the reactant manifold openings of the first housing end piece are aligned with the reactant manifold channels of the stack formation,
    wherein the first housing end piece has a base opening and a sidewall opening extending from the base opening to define a first storage compartment and the second housing end piece has a top opening and a sidewall opening extending from the top opening to define a second storage compartment, and
    wherein the stack formation is interposed between the base opening and the top opening such that the stack formation is encased with the first storage compartment and the second storage compartment and the joining means connects the first housing end piece and the second housing end piece at the interface of the sidewall opening of the first housing piece and the sidewall opening of the second housing piece.

2. The fuel cell stack of claim 1, wherein the joining means is a sealant.

3. The fuel cell stack of claim 2 wherein the sealant is a thermoplastic material.

4. The fuel cell stack of claim 2 wherein the sealant is a thermoset material.

5. The fuel cell stack of claim 1 wherein the first housing end piece and the second housing end piece are a thermoset polymer.

6. The fuel cell stack of claim 1 wherein the first housing end piece and the second housing end piece are a filled polymer composite.

7. The fuel cell stack of claim 6 wherein the filled polymer composite is a glass fiber reinforced thermoplastic.

8. The fuel cell stack of claim 1 wherein the first housing piece and the second housing piece are formed of a metal alloy.

9. A method of manufacturing a fuel cell stack comprising the steps of:
    assembling at least one fuel cell cassette, each fuel cell cassette comprising at least two unit cells, such that the fuel cell cassettes are in a stack formation relative to each other, each of the fuel cell cassettes being individually encapsulated about its entire periphery by a resin and comprising internal components which have been selectively and simultaneously sealed by penetration of the resin therein to reduce or eliminate undesired reactant flow therein, each fuel cell cassette having at least one reactant manifold opening through the thickness thereof and further having at least one planar outer surface, such that the reactant manifold openings of each fuel cell cassette are aligned to form at least one reactant manifold channel;

connecting a reactant manifold to the reactant manifold channel; and applying a compression means to the planar outer surface of the fuel cell cassettes within the stack formation, wherein such application comprises the steps of:

interposing the stack formation between a first housing piece having a base opening and a sidewall opening extending from the base opening to define a first storage compartment and further having at least one reactant manifold opening extending through the thickness of the base opening and a second housing piece having a top opening and a sidewall opening extending from the top opening to define a second storage compartment such that the reactant manifold channel is aligned with the reactant manifold opening of the first housing piece and the sidewall opening of the first housing piece is resting on the sidewall opening of the second housing piece thereby encasing the stack formation within the first and second storage compartments; and bonding the first housing piece and the second housing piece at the interface of the sidewall opening of the first housing piece and the sidewall opening of the second housing piece.

* * * * *